Figure 1:
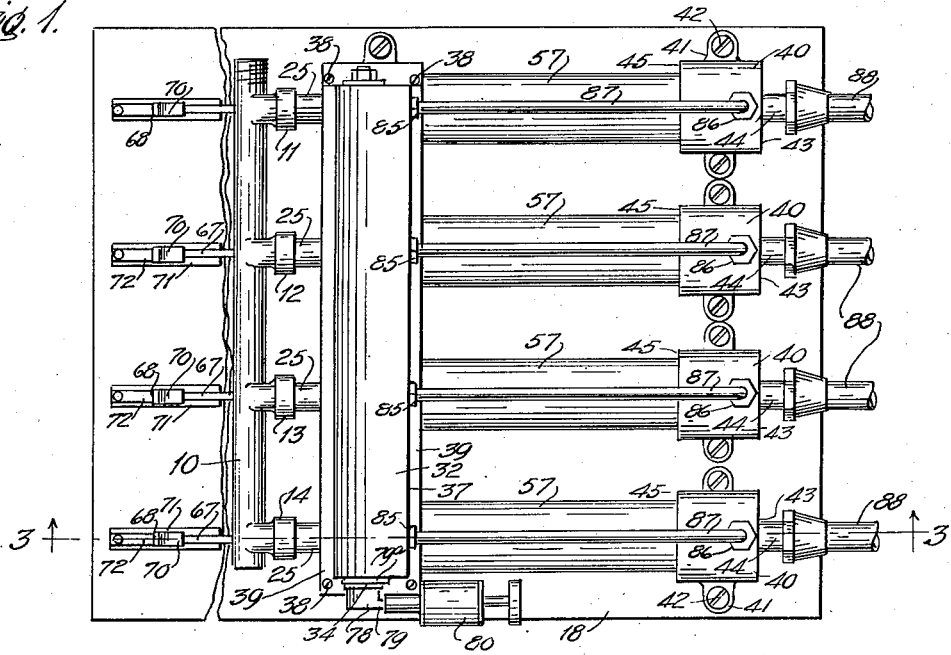

June 21, 1938.  G. B. DAVIS, JR  2,121,653
FLUID BRAKE SAFETY DEVICE
Filed June 3, 1937   2 Sheets-Sheet 1

Inventor
GEORGE B. DAVIS, JR.,

By Kimmel & Crowell
Attorneys.

June 21, 1938.    G. B. DAVIS, JR    2,121,653
FLUID BRAKE SAFETY DEVICE
Filed June 3, 1937    2 Sheets-Sheet 2
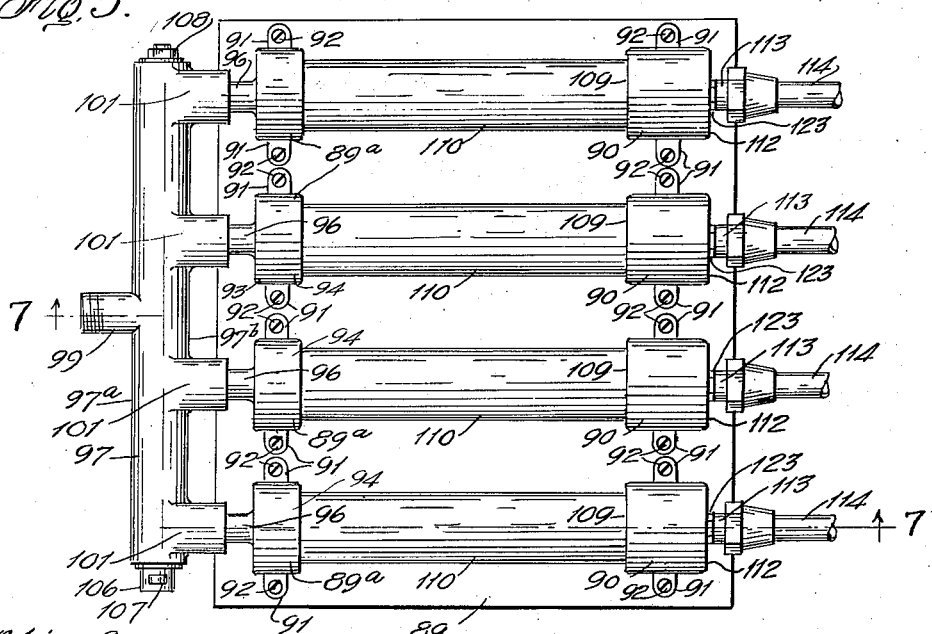
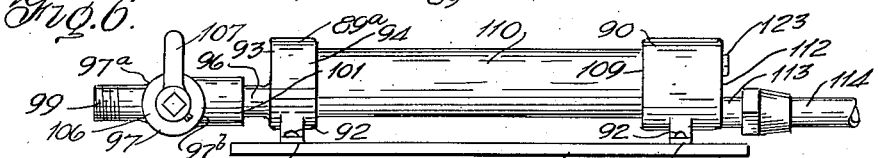
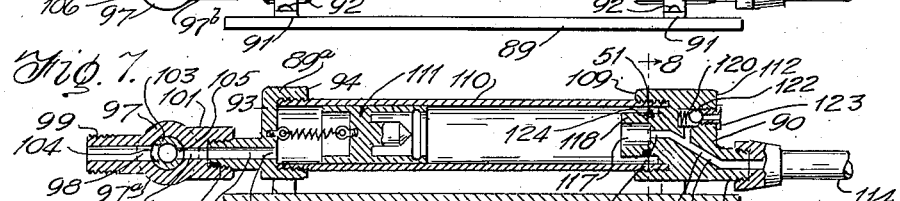
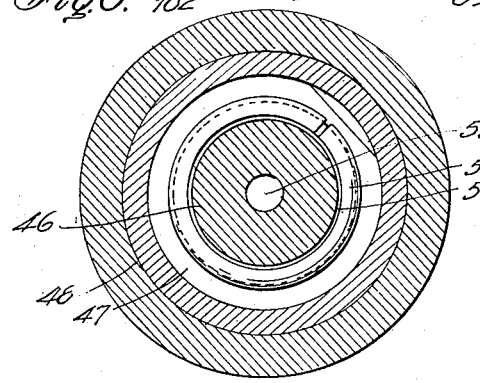
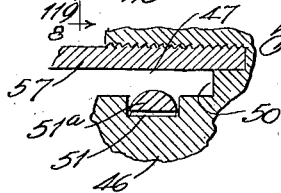
Inventor
GEORGE B. DAVIS, JR.,
By Kimmel & Crowell
Attorneys Patented June 21, 1938

2,121,653

UNITED STATES PATENT OFFICE 2,121,653

FLUID BRAKE SAFETY DEVICE

George B. Davis, Jr., Washington, D. C.

Application June 3, 1937, Serial No. 146,301

10 Claims. (Cl. 303—84)

This invention relates to a safety device for use in conjunction with hydraulic and air pressures traveling through one or more conduits.

The safety device in accordance with the invention, is designed for use in connection with hydraulic or air brakes of the four wheel type for automotive vehicles, but it is to be understood, that a safety device, in accordance with this invention, may be employed for any purpose for which it may be found applicable, and the invention has for its object to provide, in a manner as hereinafter set forth, a safety device which when forming a part of a hydraulic or air braking system for front and rear wheels of an automotive vehicle, acts to automatically shut off the forcing of pressure only through that pressure conducting line to a brake unit when a break or leak develops in such line, whereby a waste of pressure from the system is prevented and the danger of the entire brake system rendered inoperative is obviated.

The invention further aims to provide, in a manner as hereinafter set forth, a safety device including an alarm or signal for automatically indicating when a pressure conducting line breaks or develops a leak and further includes an electrically operated means for refilling the line after the latter has been repaired.

Further objects are to provide, in a manner as hereinafter set forth, a safety device for the purpose referred to which is simple in its construction and arrangement, strong, durable, compact, readily installed in respect to one or more pressure conducting lines or conduits, thoroughly efficient in its use, conveniently repaired when occasion requires, formed of detachably connected parts permitting of an impaired part being detached and a non-impaired part substituted therefor without discarding the non-impaired parts, and comparatively inexpensive to manufacture.

To aforesaid ends and to others which may hereinafter appear, the invention exists of a novel construction, combination and arrangement of parts as will be more specifically described and as illustrated in the accompanying drawings wherein are shown embodiments of the invention, but it is to be understood that changes, variations and modifications may be resorted to which fall within the scope of the invention as claimed.

In the drawings:—

Figure 2:
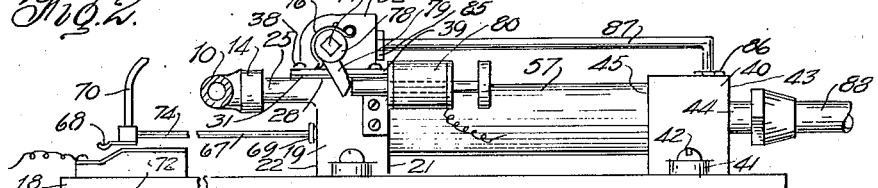
Figure 3:
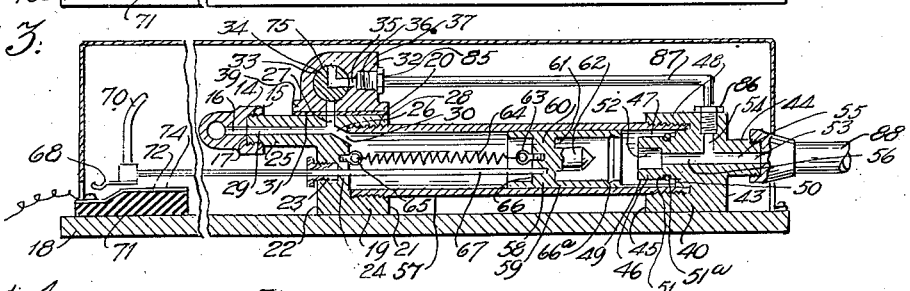
Figure 4:
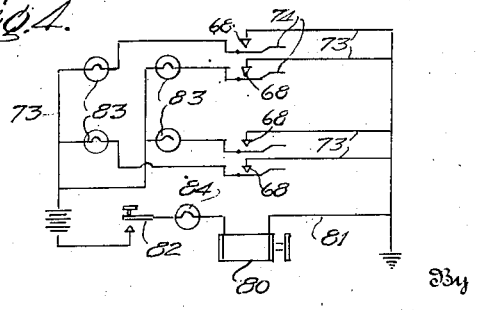

Figure 1 is a top plan view of the device installed in connection with a hydraulic braking system of the four wheel type, Figure 2 is a side elevation thereof, Figure 3 is a section on line 3—3, Figure 1 with a cover attached with the cut-off structure in warning position, Figure 4 is a diagrammatical view of the electrical signalling and the by-pass valve actuating systems, Figure 5 is a top plan view of a modified form, Figure 6 is a side elevation of the form shown in Figure 5, Figure 7 is a section on line 7—7, Figure 5 with the cut-off structure in normal position, Figure 8 is a section on line 8—8, Figures 3 and 7 upon an enlarged scale, and Figure 9 is a sectional detail illustrating the retainer ring.

With reference to Figures 1 to 4, 8 and 9, the device includes a hydraulic pressure supply pipe 10 closed at one end, open at its other end and adapted to be connected at its open end with a master cylinder, not shown. The pipe 10 is formed with a series of spaced tubular nipples 11, 12, 13, 14 which communicate with the interior of pipe 10 and constitute discharge outlets therefor. Each nipple is formed of two inner diameters, the larger of which is indicated at 15 and the smaller at 16. The junction of the two diameters form the nipple with an internal shoulder 17. The portion 15 of largest inner diameter of the nipple is threaded.

The device includes a base plate 18 upon which is secured a casting 19 formed with four equally spaced sockets 20, only one shown, opening at one side thereof and each has its wall threaded. That side of the casting 19 which the sockets 20 open is indicated at 21. Opening at the side 22 of casting 19 are four equally spaced sockets 23, only one shown, formed with threaded walls. The sockets 23 are of materially less diameter than, and open into sockets 20 and are disposed in offset relation with respect to the sockets 20. The casting 19 is provided with ports 24, only one shown, corresponding in number to that of the sockets 20 and sockets 23. Each port 24 opens into aligned sockets 20 and 23 axially of the bases of the sockets. The upper end of the wall 22 is formed with four equally spaced tubular nipples 25 and each has its inner diameter corresponding to that of the part 16 of smallest inner diameter of a nipple on the pipe 10. The nipples 25 have an end portion of the outer periphery thereof threaded. The nipples 25 extend into, threadedly engage with and abut the shoulder 17 of the nipples on the pipe 10. The upper portion of the casting 19 is provided with four equally spaced ports 26, only one shown, and each of which is of angled contour. Each port 26 includes a branch 27 which opens at the top 28 of casting 19, a branch 29 disposed at right angles to branch 27 and having its inner face forming a continuation of the inner face of the nipples 25 and a branch 30 which opens through the base of a socket 20 at a point spaced from the port 24. The inner ends of the branches 27, 29 and 30 merge into each other. The branch 30 is disposed at a downward inclination with respect to the inner ends of the branches 27, 29.

Positioned upon the top 28 of casting 19 is a sealing member 31 formed with spaced openings registering with the branches 27 of the ports 26. Arranged upon the sealing member 31 is a casting 32 formed lengthwise thereof with a bore 33 constituting a valve chamber. Within said bore 33, as well as extending from each end thereof, is a rotary valve 34 corresponding in cross-section to the shape of the bore 33. The casting 32 is formed with four equally spaced ports 35, only one shown, and each of which opens at one end into the bore 33 and at its other end into a threaded socket 36. The sockets 36, only one shown, open at the side 37 of the casting 32. The latter is anchored to the casting 19 by the hold fast means 38 which extend through flanges 39 formed at the bottom of casting 32 and also extend through the sealing member 31.

Secured upon the base plate 18 and spaced from the casting 19 is a set of castings 40 of like form and each is provided with laterally disposed apertured ears 41 through which extend hold fast devices 42 for anchoring it to base plate 18. Each casting 40 is formed on its side 43 with a peripherally threaded extension 44 and on its side 45 with an extension 46 of greater diameter than the extension 44. The side 45 is formed with an annular groove 47 having its outer wall 48 aligning with and corresponding in diameter to that of a socket 20. The outer wall 48 is threaded. The inner wall of groove 47 is indicated at 49 and is formed of two different diameters. The junction of said diameters forms wall 49 with a shoulder 50. The part of largest diameter of the wall 49 is of less length than the part of smallest diameter. The latter in proximity to the shoulder 50 is formed with an annular groove 51 extending circumferentially thereof and in which is arranged a split expansible retainer or latching ring 51ª. The setting up of the wall 49 in the manner as referred to provides the inner portion of the groove 47 of less width than its outer portion. A part of the wall 49 is provided by the extension 46. The latter is formed with a socket 52. The casting 45 is provided with an inverted T-shaped port 53 consisting of a vertical branch 54 and a pair of oppositely disposed horizontal branches 55, 56. The inner ends of said branches merge into each other. The branch 55 opens into the socket 52 axially of the base thereof. The branch 56 extends through the extension 44.

Secured in the sockets 20 and in the grooves 47 are cylinders 57 having one end closed by the casting 19 and the other end by the castings 45. Each cylinder has peripheral threads at its ends and which engage with the threads on the wall of a socket 20 and on the wall 48 of a groove 47 whereby the cylinders are fixedly secured to casting 19 and castings 40.

Slidably arranged within each of the cylinders 57 is a pressure operated spring controlled shut-off structure 58 consisting of a sleeve valve 59 formed between its transverse median and its rear end with integral transverse partition 60 provided axially of its side 61 with a needle valve 62 formed of a cone-shaped leading part and a follower part of circular cross-section. The leading part of the valve 62 for a portion of its length is adapted to extend into and abut the outer end of the wall of the branch 55 and the follower part of valve 62 is of such diameter as to snugly engage the wall of socket 52, whereby when the structure 58 is active, the valve 62 forms a double seal. Secured to the base of socket 20 is an anchor 65 for one end of the controlling spring 64 of the structure 58. The other end of spring 64 is connected to an anchor 63 secured to the side 66 of the partition 60. The normal position of the structure 58 is as shown in Figure 3. The inner face of sleeve valve 59 in proximity to its forward end is formed with an annular groove 66ª. The shoulder 50 on the wall 49 of groove 47 forms a seat for the forward end edge of sleeve valve 62. Anchored at its forward end, in the side 66 of partition 62 of each structure 58, is a carrier 67 of rod like form for a circuit closing member 68 which is anchored to and offset with respect to the rear end of the carrier 67. The carriers 67 extend through flanged bushings 69 anchored in the sockets 23 and through the openings 24 in casting 19. The rear ends of the carrier 67 have handle pieces 70.

The base plate 18 is provided with a series of spaced parallel supports 71 of insulating material and which correspond in number to the number of the carriers 67. Secured upon the supports 71 are contacts 72 normally spaced from and coacting with the members 68 for the purpose of closing normally open signal controlling circuits 73 for purpose of signalling when the structures 57 are active. The contacts 72 include high parts 74 which are engageable and wiped by members 68 when the carriers 67 move forwardly to provide for the structure 58 to seal the cylinders 57 to the ports 53.

The valve 34 is formed with a series of equally spaced angle shaped ports 75, only one shown, which are employed for establishing communication between the branches 27 of ports 26 with the ports 35 and for shutting off communication between the branches 27 of the ports 26 and the ports 35. The valve 34 is spring controlled, by a means indicated at 76. The valve 34 has a squared extension 77 at one end and upon which is fixed a collar 78 provided with a crank arm 79. The spring controlling means 76 bears against the collar 78. The valve 34 at its outer end carries a means 79ª which associates with the collar 78 for retaining valve 34 in casting 37. The valve 34 when in normal position, is as shown in Figure 3. The valve 34 is shifted from normal position by a solenoid 80 interposed in a normally open energizing circuit 81 therefor. The circuit 81 has interposed therein a manually operated normally opened circuit closer 82 therefor. There is associated with each structure 58 a signalling circuit 73 having interposed therein a signal 83. Interposed in the circuit 81 is a signal 84 to indicate when such circuit is closed. The signals 83, 84 are shown by way of example as of illuminable type.

Anchored in the sockets 32 are flanged tubular couplers 85. Anchored in the branches 54 of the ports 53 are flanged tubular couplers 86 and connected to the casting 32 by the couplers 85 and to the casting 45 by the couplers 86 are by-pass pipes 87 for establishing communication between ports 35 and the ports 53.

Coupled to the extension 44 and communicating with the branches 56 of the ports 53, are pressure conduits or lines 88 which lead to the braking devices, not shown, of the wheels of the vehicle.

It will be assumed that the parts of the device are in the position as shown in Figure 3 and with pressure equalized in the cylinders 57 on both sides of the structures 58. If a conduit 88 should leak or break, the pressure at the rear of the structure 58 associated with such conduit would shift the structure in a direction to engage the shoulder 50, wall of socket 52 and the outer end of the wall of the branch 55 of the port 53 thereby closing the latter to the cylinder 57, and on such movement to structure 58, that signal circuit which associates therewith will be closed to signal the conduit 88 is impaired and that the cylinder 57 is closed to such conduit. After the damaged conduit has been repaired, the circuit 81 is closed energizing the solenoid 80, causing it to act on arm 79 in a manner to rotate valve 34 in a direction to establish communication between ports 26, 53 whereby the repaired line will be supplied with fluid or liquid and after such fluid or liquid has been supplied to the extent of equalizing the pressure on both sides of the structure 58, the latter will be moved by its controlling spring to normal position, after which the circuit 81 is opened and which will allow of the valve 34 being automatically shifted to the position shown in Figure 3 thereby closing communication between ports 26, 53.

When the structure 58 has been shifted to engage shoulder 50, the wall of socket 52 and the outer end of branch 55 of port 53, the sleeve 59 rides against the retainer ring 51ᵃ and the latter will engage in the groove 66ᵃ and latch the structure 58 in sealing relation with respect to port 53 and further prevent the wobbling or shifting of such structure. The handles 70 of the carriers 67 are provided to conveniently permit of manually unlatching the shut-off structures 58, when occasion requires by pulling the sleeves 59 clear of the retainer rings 51.

Referring to Figures 5, 6 and 7, the base plate is indicated at 89 and arranged thereon is a set of spaced parallel castings 89ᵃ and a set of spaced parallel castings 90 which align in spaced relation with the castings 89ᵃ. Each of the castings is formed with oppositely extending apertured lateral ears 91 through which extend hold fast devices 92 for anchoring the castings to the base plate 88. The castings 89ᵃ are of like form and each consists of an upstanding circular part 93 formed on one side with an internally threaded annular flange 94. The part 93 is also formed with an opening 95 and a peripherally threaded tubular nipple 96 having its inner face registering with the wall of opening 95. The nipple 96 extends in an opposite direction with respect to that in which the flange 94 extends. Arranged rearwardly of the castings 89ᵃ is a tubular member 97 formed centrally of its rear with a radially disposed intake port 98. Integral with the side 97ᵃ of member 97 is a periphery threaded tubular nipple 99 having its inner face registering with the wall of port 98. The nipple 99 is adapted to be connected with a master cylinder, not shown. The other side 97ᵇ of the member 97 has formed therein four equally spaced parallel laterally disposed outlet ports 100, only one of which is shown. The side 97ᵇ of the element 97 has integral therewith four laterally extending tubular nipples 101 of like form and each has its inner face upon two different diameters. The junction of said diameters forms the nipple 101 with an annular shoulder 102. The part of smallest inner diameter of nipple 101 corresponds to the diameter of a port 100 and registers with the latter. The part of largest inner diameter of the nipple 101 is threaded. The inner diameter of each nipple 96 corresponds to the part of smallest diameter of the inner face of the nipple 101. The nipples 96 extend into the nipples 101, threadedly engage with these latter and abut the shoulders 102.

Arranged within the member 97 is a tubular rotatable controlling valve 103 which is common to the nipples 96. The valve 103, centrally of one side thereof, has a port 104 adapted to register with port 98 to enable the supply of fluid pressure entering the valve. The latter has its opposite side thereof formed with four spaced ports 105 adapted to register with the ports 100, whereby communication is established between the nipples 96 and the interior of the valve for the passage of pressure into the cylinders to be referred to. Only one of the ports 105 is shown. The valve 103 projects from each end of member 97 and carries on one of its projecting ends a collar 106 and a manually operated handle 107 to enable the convenient rotation of the valve to adjust it when the occasion requires. The other end of the valve has a retaining means 108 which coacts with the collar 106 for maintaining the valve from longitudinally shifting with respect to the member 97.

The castings 90 are of like form and each has its side 109 formed in the same manner as the side 45 of a casting 40. Connected at its ends to a pair of aligned castings 89, 90 is a cylinder 110 into which opens a port 95. Slidably mounted in the cylinder 110 is a pressure operated spring controlled shut-off structure 111 corresponding in form to that of structure 58 and which functions in the same manner as the latter. Each casting 90 has its side 112 formed with a peripherally threaded tubular nipple 113 connected to a pressure conduit 114 leading to the braking device, not shown, for the wheels of the vehicle. Each casting 90 is formed with a port 115 having an upper part 116 opening into socket 117 provided in the side 109 and in the extension 118 on the side 109 of a casting 90. The port 115 includes a part 119 which inclines from the part 116 and opens into the inner end of the nipple 113. The casting 90 includes a socket 120 opening at its side 112 and which has its inner portion forming a valve chamber. The casting 90 is provided with a port 121 which leads from port 115 to the inner portion of socket 120. Arranged within the socket 120 is a spring controlled check valve 122 of the ball type and which is retained in the socket by a flanged tubular nipple 123 threadedly engaging with the wall of the socket. The inner end of the nipple 123 provides a seat for the valve 122. The nipple 123 furthermore constitutes an intake for supplying fluid pressure to the conduit 114. Arranged in the inner wall of the groove 124 in the side 109 of casting 90 is a retainer 51.

If the conduit 114 should become impaired or leak, pressure against the rear side of the structure 111 will cause it to seat in the casting 90 in the same manner as that with respect to the operation of the structure 58 and will remain in seated position until pressure is equalized on both sides thereof whereby the structure will be returned to its normal position as shown in Figure 7. After the conduit 114 has been repaired, fluid is supplied thereto through the nipple 123, while the structure 111 is in a seated or sealing position.

The castings 19, 40 form respectively the intake and outlet heads for the cylinders 57. The castings 89, 90 provide respectively the intake and outlet heads for the cylinders 110. Each of the heads is ported.

Upon slow leakage or gradual loss of fluid from any line 88 the cut-off structure slowly moves to the right of Fig. 3 until it reaches approximately the position shown in that figure. If now brake application is made, the cut-off structure will move a short distance to the right but not sufficient to close the port 56. This motion, however, will effect closing of the signal circuit so that the operator has notice of the slow depletion of the brake line and may effect refilling thereof by opening the valve 34.

What I claim is:

1. In a safety device for pressure operated brakes, a pressure control for interposition in the pressure conducting means leading to the brake, said control comprising a cylinder having intake and outlet heads provided with ports for communication with said means, said outlet head being formed on its inner side with a socket and an annular groove surrounding the socket, said outlet head having its port opening into said socket through the base of the latter, and a pressure operated shut-off structure slidably mounted in said cylinder and having as parts thereof a sleeve valve and a needle valve for extension respectively into said groove, socket and port for sealing the latter to the cylinder when said structure automatically becomes active on the impairment of that part of the pressure conducting means leading from the outlet head.

2. In a safety device for pressure operated brakes, a pressure control for interposition in the pressure conducting means leading to the brake, said control comprising a cylinder having intake and outlet heads provided with ports for communication with said means, said outlet head being formed on its inner side with a socket and an annular groove surrounding the socket, said outlet head having its port opening into said socket through the base of the latter, and a pressure operated shut-off structure slidably mounted in said cylinder and having as parts thereof a sleeve valve and a needle valve for extension respectively into said groove, socket and port for sealing the latter to the cylinder when said structure automatically becomes active on the impairment of that part of the pressure conducting means leading from the outlet head, said needle valve positioned on the axis of said structure, and said sleeve valve being disposed in concentric spaced relation to said needle valve.

3. In a safety device for pressure operated brakes, a pressure control for interposition in the pressure conducting means leading to the brake, said control comprising a cylinder having intake and outlet heads provided with ports for communication with said means, said outlet head being formed on its inner side with a socket and an annular groove surrounding the socket, said outlet head having its port opening into said socket through the base of the latter, and a pressure operated shut-off structure slidably mounted in said cylinder and having as parts thereof a sleeve valve and a needle valve for extension respectively into said groove, socket and port for sealing the latter to the cylinder when said structure automatically becomes active on the impairment of that part of the pressure conducting means leading from the outlet head, said needle valve positioned on the axis of said structure, said sleeve valve being disposed in concentric spaced relation to said needle valve, said groove being of greater depth than said socket, the inner wall of said groove provided intermediate its ends with a seat for the sleeve valve, and the diameters of said needle valve and socket being such to provide a snug fit between them when said structure becomes active.

4. In a safety device for pressure operated brakes, a pressure control for interposition in the pressure conducting means leading to the brake, said control comprising a cylinder having intake and outlet heads provided with ports for communication with said means, said outlet head being formed on its inner side with a socket and an annular groove surrounding the socket, said outlet head having its port opening into said socket through the base of the latter, and a pressure operated shut-off structure slidably mounted in said cylinder and having as parts thereof a sleeve valve and a needle valve for extension respectively into said groove, socket and port for sealing the latter to the cylinder when said structure automatically becomes active on the impairment of that part of the pressure conducting means leading from the outlet head, and a controlling spring for said structure, said spring anchored at one end to said intake head and at its other end within said structure.

5. In a safety device for pressure operated brakes, a pressure control for interposition in the pressure conducting means leading to the brake, said control comprising a cylinder having intake and outlet heads provided with ports for communication with said means, said outlet head being formed on its inner side with a socket and an annular groove surrounding the socket, said outlet head having its port opening into said socket through the base of the latter, a pressure operated shut-off structure slidably mounted in said cylinder and having as parts thereof a sleeve valve and a needle valve for extension respectively into said groove, socket and port for sealing the latter to the cylinder when said structure automatically becomes active on the impairment of that part of the pressure conducting means leading from the outlet head, and a resilient latching member for holding said structure when active, said member being carried by said outlet head, arranged in said groove and engageable in the inner face of the sleeve valve.

6. In a safety device for pressure operated brakes, a pressure control for interposition in the pressure conducting means leading to the brake, said control comprising a cylinder having intake and outlet heads provided with ports for communication with said means, said outlet head being formed on its inner side with a socket and an annular groove surrounding the socket, said outlet head having its port opening into said socket through the base of the latter, a pressure operated shut-off structure slidably mounted in said cylinder and having as parts thereof a sleeve valve and a needle valve for extension respectively into said groove, socket and port for sealing the latter to the cylinder when said structure automatically becomes active on the impairment of that part of the pressure conducting means leading from the outlet head, a resilient latching member for holding said structure when active, said member being carried by said outlet head, arranged in said groove and engageable in the inner face of the sleeve valve, and a controlling spring for said structure, said spring anchored at one end to said intake head and at its other end within said structure.

7. In a safety device for pressure operated brakes, a pressure control for interposition in the pressure conducting means leading to the brake, said control comprising a cylinder having intake and outlet heads provided with ports for communication with said means, said outlet head being formed on its inner side with a socket and an annular groove surrounding the socket, said outlet head having its port opening into said socket through the base of the latter, a pressure operated shut-off structure slidably mounted in said cylinder and having as parts thereof a sleeve valve and a needle valve for extension respectively into said groove, socket and port for sealing the latter to the cylinder when said structure automatically becomes active on the impairment of that part of the pressure conducting means leading from the outlet head, a normally closed valve controlled by-pass forming means leading from the port in said intake head to the port in said outlet head, a normally open signalling circuit, means carried by said structure for closing said circuit when said structure is active for indicating when the said part of said pressure conducting means is impaired, and electrically operated means for actuating the valve of said by-pass in a direction for establishing communication between the ports in said heads when said structure is active.

8. In a safety device for pressure operated brakes, a pressure control for interposition in the pressure conducting means leading to the brake, said control comprising a cylinder having intake and outlet heads provided with ports for communication with said means, said outlet head being formed on its inner side with a socket and an annular groove surrounding the socket, said outlet head having its port opening into said socket through the base of the latter, a pressure operated shut-off structure slidably mounted in said cylinder and having as parts thereof a sleeve valve and a needle valve for extension respectively into said groove, socket and port for sealing the latter to the cylinder when said structure automatically becomes active on the impairment of that part of the pressure conducing means leading from the outlet head, a controlling spring for said structure, said spring anchored at one end to said intake head and at its other end within said structure, a normally closed valve controlled by-pass forming means leading from the port in said intake head to the port in said outlet head, a normally open signalling circuit, means carried by said structure for closing said circuit when said structure is active for indicating when the said part of said pressure conducting means is impaired, and electrically operated means for actuating the valve of said by-pass in a direction for establishing communication between the ports in said heads when said structure is active.

9. In a safety device for pressure operated brakes, a pressure control for interposition in the pressure conducting means leading to the brake, said control comprising a cylinder having intake and outlet heads provided with ports for communication with said means, said outlet head being formed on its inner side with a socket and an annular groove surrounding the socket, said outlet head having its port opening into said socket through the base of the latter, a pressure operated shut-off structure slidably mounted in said cylinder and having as parts thereof a sleeve valve and a needle valve for extension respectively into said groove, socket and port for sealing the latter to the cylinder when said structure automatically becomes active on the impairment of that part of the pressure conducting means leading from the outlet head, and means controlled by said structure, when the latter is active for indicating when the said part of the pressure conducting means is impaired.

10. In a safety device for pressure operated brakes, a pressure control for interposition in the pressure conducting means leading to the brake, said control comprising a cylinder having intake and outlet heads provided with ports for communication with said means, a pressure operated shut-off structure slidably mounted in said cylinder, said structure and the inner side of said outlet head having coacting means for sealing the port in such head to the cylinder when said structure automatically becomes active on the impairment of that part of the pressure conducting means leading from said outlet head, means controlled by said structure, when the latter is active for indicating when the said part of the pressure conducting means is impaired, a normally closed valve controlled by-pass forming means leading from the port in the intake head to the port in the outlet head, and electrically operated means for actuating the valve of said by-pass in a direction for establishing communication between the ports in said heads when said structure is active.

GEORGE B. DAVIS, Jr.